(12) United States Patent
Reck et al.

(10) Patent No.: US 6,299,936 B1
(45) Date of Patent: Oct. 9, 2001

(54) AQUEOUS COMPOSITIONS

(75) Inventors: Bernd Reck, Grünstadt; Stefan Dreher, Neustadt; Wilhelm Friedrich Beckerle, Bobenheim-Roxheim; Eckehardt Wistuba, Bad Dürkheim; Joachim Roser, Mannheim; Johannes Türk, Böhl-Iggelheim, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/463,988

(22) PCT Filed: Aug. 18, 1998

(86) PCT No.: PCT/EP98/05250

§ 371 Date: Feb. 17, 2000

§ 102(e) Date: Feb. 17, 2000

(87) PCT Pub. No.: WO99/09100

PCT Pub. Date: Feb. 25, 1999

(30) Foreign Application Priority Data

Aug. 19, 1997 (DE) .............................. 197 35 959

(51) Int. Cl.⁷ ..................................... B05D 7/08
(52) U.S. Cl. .................. 427/212; 427/389.9; 427/393
(58) Field of Search ................. 427/385.5, 212, 427/393, 389.9

(56) References Cited

U.S. PATENT DOCUMENTS

| 3,784,396 | 1/1974 | Fourment et al. . |
| 4,076,917 | 2/1978 | Swift et al. . |
| 4,420,583 | 12/1983 | Hutton . |
| 4,820,762 | 4/1989 | Tsaur . |
| 4,839,413 | 6/1989 | Kiehlbauch et al. . |
| 4,868,016 | 9/1989 | Lorah et al. . |
| 4,954,558 | 9/1990 | Tsaur . |
| 5,314,943 | 5/1994 | Steinwand . |
| 5,427,587 | 6/1995 | Arkens et al. . |
| 5,661,213 | 8/1997 | Arkens et al. . |
| 5,718,728 | 2/1998 | Arkens et al. . |
| 5,763,524 | 6/1998 | Arkens et al. . |
| 5,812,316 | 9/1998 | Ochi et al. . |

FOREIGN PATENT DOCUMENTS

| 22 14 450 | 10/1972 | (DE) . |
| 098 091 | 1/1984 | (EP) . |
| 257 567 | 3/1988 | (EP) . |
| 445 578 | 9/1991 | (EP) . |
| 576 128 | 12/1993 | (EP) . |
| 583 086 | 2/1994 | (EP) . |
| 651 088 | 5/1995 | (EP) . |
| 672 920 | 9/1995 | (EP) . |
| 7-118619 | * 5/1995 | (JP) . |
| 97/31060 | * 8/1997 | (WO) . |

* cited by examiner

Primary Examiner—Erma Cameron
(74) Attorney, Agent, or Firm—Oblon, Spivak, McClelland, Maier & Neustadt, P.C.

(57) ABSTRACT

Thermally curable aqueous compositions comprising a low-acid and an acid-rich polymer component and also a hydroxyalkylated amine are used as binders for shaped articles.

30 Claims, No Drawings

AQUEOUS COMPOSITIONS

The present invention relates to using thermally curable aqueous compositions comprising a low-acid and an acid-rich polymer component and also a hydroxyalkylated amine as binders for shaped articles.

Sheetlike fibrous structures, for example fiber webs, shaped articles such as chipboard, etc., are frequently consolidated chemically using a polymeric binder. To enhance the strength, especially the wet and heat resistance strengths, binders are frequently used that comprise formaldehyde-eliminating crosslinkers. This means, however, that there is a danger of formaldehyde emissions.

Various alternatives to prior art binders have been proposed to avoid formaldehyde emissions. For instance, U.S. Pat. No. 4,076,917 discloses binders comprising polymers containing carboxylic acid or carboxylic anhydride, with β-hydroxyalkylamides as crosslinkers. The molar ratio of carboxyls to hydroxyls is preferably 1:1. A disadvantage is the relatively costly production of the β-hydroxyalkylamides.

EP-A-445 578 discloses sheets composed of finely divided materials, for example glass fibers, in which mixtures of high molecular mass polycarboxylic acids and polyhydric alcohols, alkanolamines or polyvalent amines act as binders. The described high molecular mass polycarboxylic acids are polyacrylic acid, copolymers of methyl methacrylate/n-butylacrylate/methacrylic acid, and of methyl methacrylate/methacrylic acid. Polyhydric alcohols and alkanolamines employed are 2-hydroxymethyl-1,4-butanediol, trimethylolpropane, glycerol, poly(methyl methacrylate-co-hydroxypropyl acrylate), diethanolamine and triethanolamine. However, the sheets obtained are not sufficiently water-resistant.

EP-A-583 086 discloses formaldehyde-free aqueous binders for producing fiber webs, especially glass fiber webs. The binders comprise a polycarboxylic acid containing at least two carboxyls with or without anhydride groups. Polyacrylic acid in particular is used. The binder further comprises a polyol, for example glycerol, bis[N,N-di(β-hydroxyethyl)]adipamide, pentaerythritol, diethylene glycol, ethylene glycol, gluconic acid, β-D-lactose, sucrose, polyvinyl alcohol, diisopropanolamine, 2-(2-aminoethylamino)ethanol, triethanolamine, tris(hydroxymethylamino)methane and diethanolamine. These binders require a phosphorus-containing reaction accelerant to obtain glass fiber webs having adequate strengths. It is noted that the presence of such a reaction accelerant can only be dispensed with if a highly reactive polyol is employed. β-Hydroxyalkylamides are mentioned as highly reactive polyols.

EP-A-651 088 describes corresponding binders for substrates composed of cellulose fiber. For these binders the inclusion of a phosphorus-containing reaction accelerant is mandatory.

EP-A-672 920 describes formaldehyde-free binding, impregnating or coating compositions comprising a polymer, constituted by from 2 to 100% by weight of an ethylenically unsaturated acid or acid anhydride as comonomer, and at least one polyol. The polyols are substituted triazine, triazinetrione, benzene or cyclohexyl derivatives, the polyol radicals always being located in positions 1,3,5 of the rings mentioned. Despite a high drying temperature, the binders provide only low wet breaking strengths on glass fiber webs. Amine-containing crosslinkers and predominantly linear polyols were tested too as part of comparative experiments. It is noted that amine-containing crosslinkers have a flocculating effect and that the predominantly linear polyols lead to weaker crosslinking than the cyclic polyols.

DE-A-22 14 450 describes a copolymer constituted by from 80 to 99% by weight of ethylene and from 1 to 20% by weight of maleic anhydride. The copolymer, in powder form or in dispersion in an aqueous medium, is used for surface coating together with a crosslinker. The crosslinker used is an amino-containing polyalcohol. Crosslinking of the system, however, requires heating at up to 300° C.

EP-A-257 567 describes a polymer composition which is obtainable by emulsion polymerization of ethylenically unsaturated monomers, such as olefins, vinylaromatic compounds, α,β-ethylenically unsaturated carboxylic acids and their esters, ethylenically unsaturated dicarboxylic anhydrides and vinyl halides. In the course of polymerization a water- or alkali-soluble or —dispersible resin having a number-average molecular weight of from about 500 to about 20,000 is added in order to influence the flow properties of the polymer composition. The resin is composed of olefins, vinylaromatic compounds, α,β-ethylenically unsaturated carboxylic acids and the esters thereof or ethylenically unsaturated dicarboxylic anhydrides. Ammonium hydroxide is indicated as an alkaline medium in which said resin should be soluble or dispersible The composition can be used to produce formaldehyde-free coatings on wood substrates.

EP-A-576 128 describes repulpable adhesive compositions comprising an acid-rich polymer component and a low-acid polymer component. The acid-rich component is based on a monomeric mixture of from 40 to 95% of an alkyl acrylate or alkyl methacrylate and from 5 to 60% of an ethylenically unsaturated acid such as acrylic or methacrylic acid. The low-acid component is based on a monomer mixture of from 90 to 100% of an alkyl acrylate or alkyl methacrylate and from 0 to 10% of an ethylenically unsaturated acid. The composition is prepared by aqueous emulsion polymerization, the acid-rich polymer component being polymerized in the presence of the low-acid polymer component, or vice versa. The pH of the composition is adjusted to the desired level by adding ammonium hydroxide or sodium hydroxide. The composition can be used as a pressure-sensitive adhesive, laminating adhesive, textiles adhesive, tile adhesive and packaging adhesive and as a wood glue.

U.S. Pat. No. 4,420,583 and EP-A-098 091 both describe a binder composition comprising an acid-rich polymer dispersion and a solution polymer. The basis of the latex is a monomer composition of vinylaromatic compounds and alkyl (meth)acrylates and up to 20% of an ethylenically unsaturated acid. The solution polymer contains at least 10% of a monomer comprising (halohydroxypropyl)ammonium groups. The composition is stable on storage and cures at room temperature after base (NaOH or the like) has been added. It is used for formaldehyde-free binders, adhesives and coatings.

U.S. Pat. No. 5,314,943 describes a mixture consisting of a polymer dispersion and a water-soluble copolymer, and its use as a binder for fiber webs. The polymer includes not only vinylaromatic compounds and alkyl (meth)acrylates but also preferably bifunctional monomers such as butadiene and vinyl acrylates. The mixture's content of solution polymer is up to 5%, and the polymer itself consists of 25–60% of an ethylenically unsaturated monocarboxylic acid and 40–75% of an ethylenically unsaturated dicarboxylic acid. Disadvantages are the high temperatures required for curing.

U.S. Pat. No. 4,868,016 describes a composition based on at least one thermoplastic latex polymer, insoluble in aqueous alkaline medium, and at least one alkali-soluble polymer, which is incompatible with the latex polymer. The latex polymer is an aqueously dispersed polymer which can be composed of acrylic or methacrylic esters, vinylaromatic compounds and vinyl esters and which additionally comprises from 0.5 to 3% by weight of an ethylenically unsaturated carboxylic acid, in copolymerized form. The alkali-soluble polymer is composed of the same monomers but contains from 10 to 60% by weight of an ethylenically unsaturated carboxylic acid. To establish a pH of >7 the composition can contain ammonia, triethylamine, ethylamine or dimethylhydroxyethylamine. One of its possible uses is to provide substrates with a coating.

It is an object of the present invention to provide formaldehyde-free binders for shaped articles, which permit rapid curing at low temperature and impart good mechanical properties and high climatic resistance to the substrate.

We have found that this object is achieved using a composition comprising a polymer having few carboxyl groups, a polymer rich in carboxyl groups, and an amine having at least two hydroxyalkyl groups.

The present invention thus provides for the use of thermally curable compositions comprising A) at least one polymer, obtainable by free-radical polymerization, which comprises ≦5% by weight of an α,β-ethylenically unsaturated mono- or dicarboxylic acid, in copolymerized form, B) at least one polymer, obtainable by free-radical polymerization, which comprises ≧15% by weight of an α,β-ethylenically unsaturated mono- or dicarboxylic acid, in copolymerized form, and C) at least one alkanolamine having at least two OH groups.

For the purposes of the present invention alkyl is preferably straight-chain or branched $C_1$–$C_{18}$-alkyl, especially $C_1$–$C_{12}$- and, with particular preference, $C_1$–$C_6$-alkyl, such as methyl, ethyl, n-propyl, i-propyl, n-butyl, sec-butyl, tert-butyl, n-pentyl, n-hexyl, 2-ethylhexyl, n-dodecyl or n-stearyl.

Hydroxyalkyl is preferably hydroxy-$C_1$–$C_6$-alkyl and, in particular, 2-hydroxyethyl and 2- or 3-hydroxypropyl.

Cycloalkyl is preferably $C_5$–$C_7$-cyclohexyl, especially cyclopentyl and cyclohexyl.

Aryl is preferably phenyl or naphthyl.

Component (A)

The component (A) employed can be any polymer that is obtainable by free-radical polymerization and contains ≦5% by weight of an α,β-ethylenically unsaturated mono- or dicarboxylic acid in copolymerized form. In general, such a polymer will be obtained by emulsion polymerization. It is equally possible, however, to employ polymers obtainable by another kind of polymerization, suspension polymerization being one example. The polymer is preferably employed in the form of a dispersion having in particular a polymer content in the range from 40 to 80% by weight, especially from 50 to 75% by weight. This dispersion can be a primary dispersion, in other words a dispersion as obtained from the emulsion polymerization, or a secondary dispersion, in other words a dispersion obtained by taking an already isolated polymer and dispersing it subsequently in the dispersion medium.

The dispersion medium involved is generally water. It is also possible, however, for water-miscible organic solvents to be present, such as alcohols and ketones, examples being methanol, ethanol, n-propanol, isopropanol, n-butanol, acetone and methyl ethyl ketone.

The α,β-ethylenically unsaturated mono- and dicarboxylic acids involved are, in particular, those having 3 to 6 carbons. Examples are acrylic, methacrylic, crotonic, fumaric, maleic, 2-methylmaleic or itaconic acids and also monoesters of ethylenically unsaturated dicarboxylic acids, such as maleic acid monoalkyl esters of $C_1$–$C_8$-alkanols.

The polymer (A) may also comprise in copolymerized form any ethylenically unsaturated monomer (monomers b) which can be copolymerized with the mono- or dicarboxylic acid. Such monomers are:

Vinylaromatic compounds, such as styrene, α-methylstyrene and vinyltoluenes (monomers $b_1$).

Linear 1-olefins, branched-chain 1-olefins or cyclic olefins (monomers $b_2$), such as ethene, propene, butene, isobutene, pentene, cyclopentene, hexene, cyclohexene, octene, 2,4,4-trimethyl-1-pentene alone or in a mixture with 2,4,4-trimethyl-2-pentene, $C_8$–$C_{10}$ olefin, 1-dodecene, $C_{12}$–$C_{14}$ olefin, octadecene, 1-eicosene ($C_{20}$), $C_{20}$–$C_{24}$ olefin; oligoolefins prepared with metallocene catalysis and having a terminal double bond, such as oligopropene, oligohexene and oligooctadecene; olefins prepared by cationic polymerization and having a high α-olefin content, such as polyisobutene. Preferably, however, no ethene or linear 1-olefin is copolymerized into the polymer.
Butadiene.

Vinyl and allyl alkyl ethers with 1 to 40 carbons in the alkyl, it also being possible for said alkyl to carry other substituents such as hydroxyl, amino or dialkylamino or one or more alkoxylate groups (monomers $b_3$), examples being methyl, ethyl, propyl, isobutyl, 2-ethylhexyl, cyclohexyl, 4-hydroxybutyl, decyl, dodecyl, octadecyl, 2-(diethylamino) ethyl, 2-(di-n-butylamino)ethyl and methyldiglycol vinyl ether, and the corresponding allyl ethers, and/or mixtures thereof.

Acrylamides and alkyl-substituted acrylamides (monomers $b_4$), such as acrylamide, methacrylamide, N-tert-butylacrylamide and N-methyl(meth)acrylamide.

Sulfo-containing monomers (monomers $b_5$), such as styrenesulfonate, allylsulfonic, methallylsulfonic, vinylsulfonic, allyloxybenzenesulfonic and 2-acrylamido-2-methylpropanesulfonic acid, and their corresponding alkali metal salts or ammonium salts, and/or mixtures thereof.

$C_1$–$C_8$-alkyl esters or $C_1$–$C_4$-hydroxyalkyl esters of $C_3$–$C_6$ mono- or dicarboxylic acids (see above) especially of acrylic, methacrylic or maleic acid, or esters of these acids with $C_1$–$C_{18}$ alcohols that have been alkoxylated with from 2 to 50 mol of ethylene, propylene or butylene oxide or mixtures of these oxides (monomers $b_6$), examples being methyl, ethyl, propyl, isopropyl, butyl, hexyl, 2-ethylhexyl, hydroxyethyl or hydroxypropyl (meth)acrylate, 1,4-butanediol monoacrylate, dibutyl maleate, ethyldiglycol acrylate, methylpolyglycol acrylate (11 EO), (meth)acrylic esters of $C_{13}/C_{15}$ oxo alcohol reacted with 3,5,7,10 or 30 mol of ethylene oxide, and/or mixtures thereof.

Alkylaminoalkyl (meth)acrylates or alkylaminoalkyl (meth)acrylamides, or their quaternization products (monomers $b_7$), examples being 2-(N,N-dimethylamino) ethyl (meth)acrylate, 3-(N,N-dimethylamino)propyl (meth) acrylate, 2-(N,N,N-trimethylammonium)ethyl (meth) acrylate chloride, 2-dimethylaminoethyl(meth)acrylamide, 3-dimethylaminopropyl(meth)acrylamide and 3-trimethylammoniumpropyl(meth)acrylamide chloride.

Vinyl and allyl esters of $C_1$–$C_{30}$ monocarboxylic acids (monomers $b_8$), such as vinyl formate, acetate, propionate, butylate, valerate, 2-ethylhexanoate, nonanoate, decanoate, pivalate, palmitate, stearate and laurate.

As additional monomers, $b_9$, there may be mentioned:
N-vinylformamide, N-vinyl-N-methylformamide, styrene, α-methylstyrene, 3-methylstyrene, butadiene, N-vinylpyrrolidone, N-vinylimidazole, 1-vinyl-2-methylimidazole, 1-vinyl-2-methylimidazoline, N-vinylcaprolactam, acrylonitrile, methacrylonitrile, allyl alcohol, 2-vinylpyridine, 4-vinylpyridine, diallyldimethylammonium chloride, vinylidene chloride, vinyl chloride, acrolein, methacrolein and vinylcarbazole and/or mixtures thereof.

Preferred further monomers are the abovementioned esters of acrylic and methacrylic acid, the vinylaromatic compounds, butadiene, vinyl esters, (meth)acrylonitrile and the abovementioned (meth)acrylamides.

Particularly preferred comonomers are methyl acrylate, ethyl acrylates, butyl acrylates, 2-ethylhexyl acrylate, methyl methacrylate, butyl methacrylates, hydroxyethyl acrylates, hydroxypropyl acrylate, hydroxybutyl acrylates, hydroxyethyl methacrylate, styrene, butadiene, vinyl acetate, acrylonitrile, methacrylonitrile, acrylamide, methacrylamide and/or N-butylacrylamide.

The polymers can be prepared by usual polymerization techniques, for example by free-radical bulk, emulsion, suspension, dispersion, precipitation and solution polymerization. These polymerization techniques are preferably operated in the absence of oxygen, preferably in a stream of nitrogen. All polymerization methods use the customary apparatus, examples being stirred vessels, cascades of stirred vessels, autoclaves, tube reactors and kneading apparatus. It is preferred to operate by the method of emulsion, precipitation or suspension polymerization. Particular preference is given to the method of emulsion polymerization in an aqueous medium.

The use of aqueous emulsion polymerization gives polymers having a weight-average molecular weight of from 1000 to 2,000,000, preferably from 5000 to 500,000. The K values are generally in the range from 15 to 150 (1% strength by weight in dimethylformamide). The weight-average particle size (determined by means of an ultracentrifuge) is preferably in the range from 50 to 1000 nm. The dispersion may have a monomodal or polymodal particle size distribution. The emulsion polymerization can be conducted such that the volume solids content is in the range from 20 to 70%, preferably from 30 to 60%.

Emulsion polymerization with the above-mentioned carboxyl-containing monomers takes place conventionally, as described, for example, in DE-A-31 34 222 or in U.S. Pat. No. 5,100,582.

The polymerization is preferably conducted in the presence of compounds which form free radicals (initiators). Preferably from 0.05 to 15% by weight, with particular preference from 0.2 to 8% by weight, of these compounds is required, based on the monomers employed in the polymerization.

Examples of suitable polymerization initiators are peroxides, hydroperoxides, peroxodisulfates, percarbonates, peroxo esters, hydrogen peroxide and azo compounds. Examples of initiators, which may be either soluble or insoluble in water, are hydrogen peroxide, dibenzoyl peroxide, dicyclohexyl peroxodicarbonate, dilauroyl peroxide, methyl ethyl ketone peroxide, di-tert-butyl peroxide, acetylacetone peroxide, tert-butyl hydroperoxide, cumene hydroperoxide, tert-butyl perneodecanoate, tert-amyl perpivalate, tert-butyl perpivalate, tert-butyl perneohexanoate, tert-butyl per-2-ethylhexanoate, tert-butyl perbenzoate, the peroxodisulfates of lithium, sodium, potassium and ammonium, azodiisobutyronitrile, 2,2'-azobis(2-amidinopropane)dihydrochloride, 2-(carbamoylazo) isobutyronitrile and 4,4-azobis(4-cyanovaleric acid). The known redox initiator systems can also be used as polymerization initiators.

The initiators can be employed alone or in a mixture with one another, examples being mixtures of hydrogen peroxide and sodium peroxodisulfate. For polymerization in an aqueous medium it is preferred to employ water-soluble initiators.

To prepare polymers of low average molecular weight it is often judicious to conduct the copolymerization in the presence of regulators. This can be done using conventional regulators, examples being organic SH-containing compounds such as 2-mercaptoethanol, 2-mercaptopropanol, mercaptoacetic acid, tert-butyl mercaptan, n-octyl mercaptan, n-dodecyl mercaptan and tert-dodecyl mercaptan, $C_1$–$C_4$ aldehydes, such as formaldehyde, acetaldehyde, propionaldehyde, hydroxylammonium salts, such as hydroxylammonium sulfate, formic acid, sodium bisulfite or isopropanol. The polymerization regulators are generally employed in amounts of from 0.1 to 10% by weight, based on the monomers.

To prepare copolymers of relatively high molecular weight it is often judicious to carry out polymerization in the presence of crosslinkers. Such crosslinkers are compounds having two or more ethylenically unsaturated groups, such as diacrylates or dimethacrylates of at least dihydric saturated alcohols, examples being ethylene glycol diacrylate, ethylene glycol dimethacrylate, 1,2-propylene glycol diacrylate, 1,2-propylene glycol dimethacrylate, 1,4-butanediol diacrylate, 1,4-butanediol dimethacrylate, hexanediol diacrylate, hexanedioldimethacrylate, neopentyl glycol diacrylate, neopentyl glycol dimethacrylate, 3-methylpentanediol diacrylate and 3-methylpentanediol dimethacrylate. The acrylic and methacrylic esters of alcohols having more than two OH groups can also be employed as crosslinkers, examples being trimethylolpropane triacrylate and trimethylolpropane trimethacrylate. A further class of crosslinkers is that of diacrylates or dimethacrylates of polyethylene glycols or polypropylene glycols having molecular weights of in each case from 200 to 9000.

In addition to the homopolymers of ethylene oxide and/or propylene oxide it is also possible to employ block copolymers of ethylene oxide and propylene oxide or copolymers of ethylene oxide and propylene oxide in which the ethylene oxide and propylene oxide units are distributed at random. The oligomers of ethylene oxide and/or propylene oxide are also suitable for preparing the crosslinkers, examples being diethylene glycol diacrylate, diethylene glycol dimethacrylate, triethylene glycol diacrylate, triethylene glycol dimethacrylate, tetraethylene glycol diacrylate and/or tetraethylene glycol dimethacrylate.

Further suitable crosslinkers are vinyl acrylate, vinyl methacrylate, vinyl itaconate, divinyl adipate, butanediol divinyl ether, trimethylolpropane trivinyl ether, allyl acrylate, allyl methacrylate, pentaerythritol triallyl ether, triallylsucrose, pentaallylsucrose, methylenebis(meth) acrylamide, divinylethyleneurea, divinylpropyleneurea, divinylbenzene, divinyldioxane, triallyl cyanurate, tetraallylsilane, tetravinylsilane and bis- or polyacrylosiloxanes (e.g. Tergomers® from Th. Goldschmidt AG). The crosslinkers are preferably employed in amounts of from 10 ppm to 5% by weight, based on the monomers to be polymerized.

When operating in accordance with the method of emulsion, precipitation, suspension or dispersion polymerization it may be advantageous to stabilize the polymer droplets or particles by means of surface-active auxiliaries. Such auxiliaries are typically emulsifiers or protective colloids. Anionic, nonionic, cationic and amphoteric emulsifiers are suitable. Preference is given to anionic emulsifiers, of which examples are alkylbenzenesulfonic acids, sulfonated fatty acids, sulfosuccinates, fatty alcohol sulfates, alkylphenol sulfates and fatty alcohol ether sulfates. As nonionic emulsifiers it is possible, for example, to use alkylphenol ethoxylates, primary alcohol ethoxylates, fatty acid ethoxylates, alkanolamide ethoxylates, fatty amine ethoxylates, EO/PO block copolymers and alkyl polyglucosides. Cationic or amphoteric emulsifiers which can be employed are quaternized amino alkoxylates, alkyl betaines, alkylamidobetaines and/or sulfobetaines, for example. Examples of typical protective colloids are cellulose derivatives, polyethylene glycol, polypropylene glycol, copolymers of ethylene glycol and propylene glycol, polyvinyl acetate, polyvinyl alcohol, polyvinyl ethers, starch and starch derivatives, dextran, polyvinylpyrrolidone, polyvinylpyridine, polyethyleneimine, polyvinylimidazole, polyvinylsuccinimide, polyvinyl-2-methylsuccinimide, polyvinyl-1,3-oxazolid-2-one, polyvinyl-2-methylimidazoline and copolymers containing maleic acid or maleic anhydride, as are described, for example, in DE 2 501 123.

The emulsifiers or protective colloids are generally employed in concentrations of from 0.05 to 20% by weight, based on the monomers.

If polymerization is conducted in aqueous emulsion or dilution, then the monomers can be fully or partly neutralized by means of customary, inorganic or organic bases prior to or during the polymerization. Examples of suitable bases are alkali metal or alkaline earth metal compounds, such as sodium, potassium or calcium hydroxide, sodium carbonate, ammonia and primary, secondary or tertiary amines, such as di- or triethanolamine.

With particular preference, prior to and during polymerization the ethylenically unsaturated carboxylic acids are not neutralized. Preferably, no neutralizing agent, apart from component (C), is added after the polymerization either.

The polymerization can be carried out in a customary manner in accordance with a large number of variants, continuously or discontinuously.

If the addition polymer is prepared by the method of a solution, precipitation or suspension polymerization in a steam-volatile solvent or solvent mixture, then the solvent can be separated off by introducing steam, so as to arrive at an aqueous solution or dispersion. The polymer can also be separated by a drying process from the organic diluent.

Component (B)

From 15 to 100% by weight of component (B), preferably from 20 to 100% by weight and, with particular preference, from 40 to 100% by weight is composed of at least one ethylenically unsaturated mono- or dicarboxylic acid. The polymer may also be wholly or partly in the form of a salt, although the acidic form is preferred. The polymer, both in the acidic form and in the salt form, is preferably soluble in water. It is essentially free from carboxylic anhydride structures.

The weight-average molecular weight of component (B) is greater than 500 and generally smaller than 5 million. The K values of the polymers (in accordance with H. Fikentscher, Cellulose-Chemie 13 (1932), pp. 58–64, 71 and 74), which are a measure of the molecular weight, are in general in the range from 10 to 150 (measured in 1% strength by weight solution). The polymer generally has at least 4 carboxyl groups, or salt groups derived therefrom, per polymer chain.

Ethylenically unsaturated carboxylic acids that can be used have already been specified above in connection with component (A). The polymers can also be obtained starting from ethylenically unsaturated mono- or dicarboxylic anhydrides, alone or in a mixture with the abovementioned carboxylic acids. The anhydride functions are converted to carboxyl groups under the conditions of polymerization, for example in solution or emulsion polymerization in the aqueous medium, or by reaction with an acid or base following polymerization. Ethylenically unsaturated carboxylic anhydrides which can be used are, in particular, maleic, itaconic, acrylic and methacrylic anhydride.

Particularly preferred monomers for preparing component B are acrylic and methacrylic acid, methacrylic anhydride, maleic anhydride, maleic acid, methyl methacrylate, tert-butyl methacrylate, ethyl acrylate, n-butyl acrylate, 2-hydroxyethyl acrylate, styrene and acrylamido-2-methylpropanesulfonic acid.

In addition to the mono- or dicarboxylic acids the polymer (B) may also comprise from 0 to 85% by weight, preferably from 0 to 80% by weight and, in particular, from 0 to 60% by weight of at least one further monomer in copolymerized form. Monomers which can be used have already been specified above in connection with component (A) (identified there as monomers b). The implementation of the polymerization, and auxiliaries, have already been described above in connection with component (A)

In addition to the polymerization technique specified above in connection with component (A), the polymers (B) can also be prepared by solution polymerization.

The use of aqueous free-radical solution polymerization gives water-soluble polymers and copolymers, starting preferably from 50–100% by weight of the abovementioned carboxylic acids, carboxylic anhydrides, monoesters or a mixture of two or more of these compounds. Their weight-average molecular weight is generally in the range from 500 to 1,000,000, preferably from 2000 to 200,000. The K values of the polymers are generally in the range from 10 to 150, preferably from 15 to 100 (measured in 1% strength by weight solution in water). The solids content is generally in the range from 10 to 80% by weight, preferably from 20 to 65% by weight. The polymerization can be conducted at from 20 to 300° C., preferably from 60 to 200° C. Solution polymerization is conducted conventionally as described, for example, in EP-A-75 820 or DE-A-36 20 149.

The polymer (B) can also be obtained by grafting maleic acid and/or maleic anhydride and/or a monomer mixture comprising maleic acid or maleic anhydride onto a graft base. Examples of suitable graft bases are monosaccharides, oligosaccharides, modified polysaccharides and alkyl polyglycol ethers. Such graft polymers are described, for example, in DE-A-4 003 172 and EP-A-116 930.

Component (C)

Suitable as component (C) are alkanolamines of the formula:

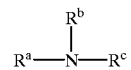

where $R^a$ is H, $C_1$–$C_{10}$-alkyl or $C_1$–$C_{10}$-hydroxyalkyl and $R^b$ and $R^c$ are $C_1$–$C_{10}$-hydroxyalkyl.

With particular preference, $R^b$ and $R^c$ independently are $C_2$–$C_5$-hydroxyalkyl and $R^a$ is H, $C_1$–$C_5$-alkyl or $C_2$–$C_5$-hydroxyalkyl.

Examples of compounds of this formula are diethanolamine, triethanolamine, diisopropanolamine, triisopropanolamine, methyldiethanolamine, butyldiethanolamine and methyldiisopropanolamine. Particular preference is given to triethanolamine.

Also suitable are alkanolamines which are selected from water-soluble, linear or branched aliphatic compounds which comprise per molecule at least two functional amino groups of the type (a) or of the type (b)

 (a)

 (b)

where R is hydroxyalkyl and R' is alkyl. The alkanolamines concerned preferably comprise at least one compound of the formula I:

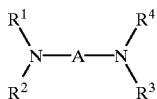 (I)

where

A is $C_2$–$C_{18}$-alkylene which is unsubstituted or substituted by one or more groups selected independently from alkyl, hydroxyalkyl, cycloalkyl, OH and $NR^6R^7$, where $R^6$ and $R^7$ independently are H, hydroxyalkyl or alkyl, and which is uninterrupted or interrupted by one or more oxygens and/or groups $NR^5$ where $R^5$ is H, hydroxyalkyl, $(CH_2)_nNR^6R^7$, where n is 2 to 5 and $R^6$ and $R^7$ are as defined above, or alkyl, which in turn is interrupted by one or more groups $NR^5$ where $R^5$ is as defined above, and/or is substituted by one or more groups $NR^6R^7$, where $R^6$ and $R^7$ are as defined above; or A is a radical of the formula:

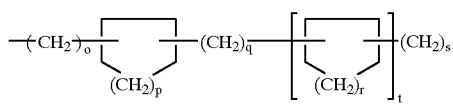

where o, q and s independently are 0 or an integer from 1 to 6, p and r independently are 1 or 2 and
t is 0, 1 or 2,
it also being possible for the cycloaliphatic radicals to be substituted by 1, 2 or 3 alkyls, and
$R^1$, $R^2$ and $R^3$ and $R^4$ independently are H, hydroxyalkyl, alkyl or cycloalkyl, the compounds having at least two, preferably at least three, hydroxyalkyls per molecule.

Particularly preferred as component (C) are:
(1) Compounds of the formula Ia

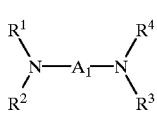 (Ia)

where
$A_1$ is $C_2$–$C_{12}$ alkylene which is unsubstituted or substituted by at least one alkyl and/or at least one group $NR^6R^7$, where $R^6$ and $R^7$ independently are alkyl or hydroxyalkyl, and $R^1$, $R^2$, $R^3$ and $R^4$ independently are hydroxyalkyl or H, or one of $R^1$ and $R^2$ and/or one of $R^3$ and $R^4$ is alkyl or cycloalkyl.

Particularly useful compounds of this type are the compounds of the following formulae:

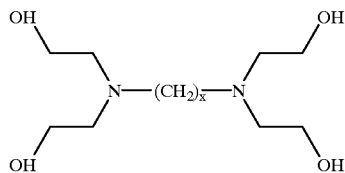

where x is 2 to 12, especially 2, 3, 6, 8, 10 or 12,

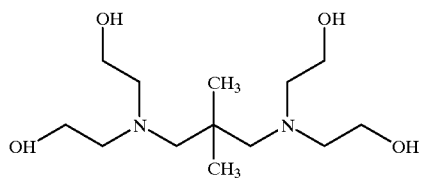

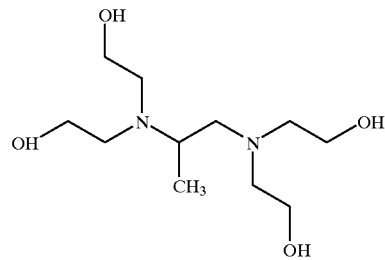

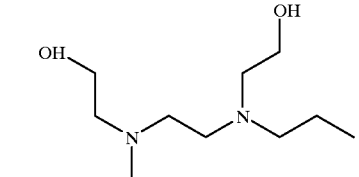

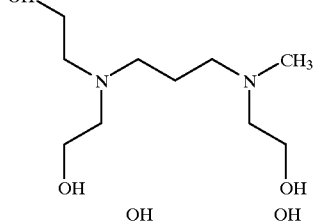

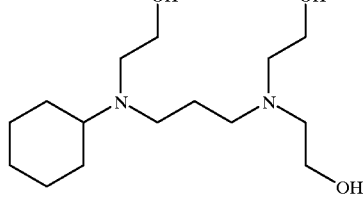

Other compounds of the formula Ia are the aminals of the formula

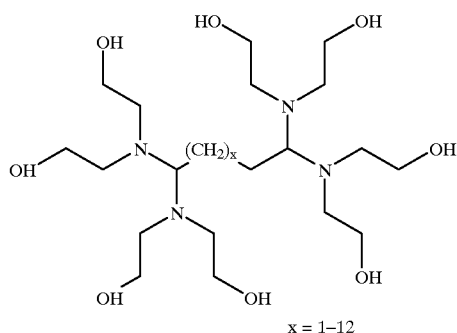

x = 1–12

(2) Compounds of the formula Ib

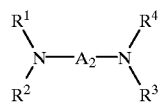
(Ib)

where

A$_2$ is C$_2$–C$_8$-alkylene which is interrupted by at least one group NR$^5$ where R$^5$ (or each R$^5$ independently) is hydroxyalkyl or alkyl, and R$^1$, R$^2$, R$^3$ and R$^4$ independently are hydroxyalkyl or H.

The radical A$_2$ is preferably interrupted by one or two groups NR$^5$. Particularly useful compounds of this type are the compounds of the following formulae:

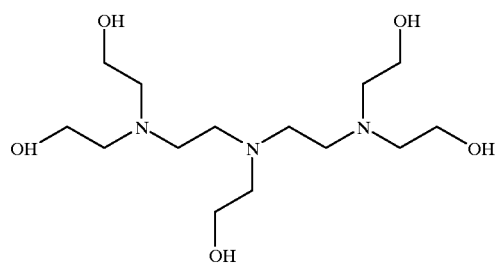

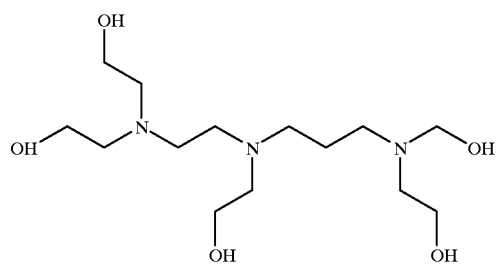

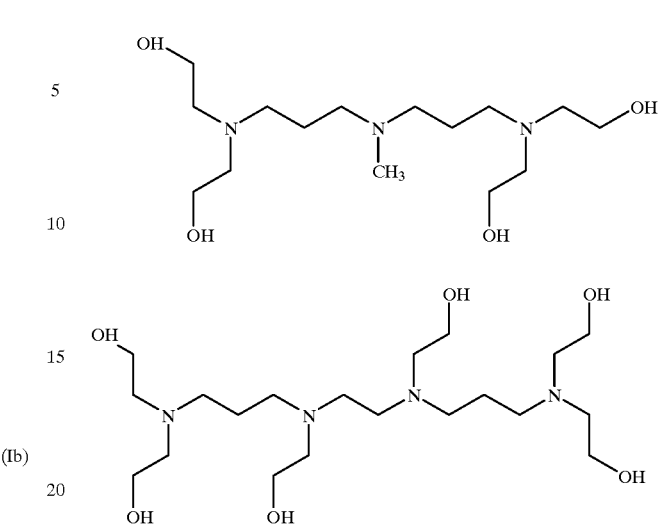

(3) Compounds of the formula Ic:

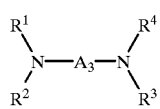
(Ic)

A$_3$ is C$_2$–C$_8$-alkylene which is interrupted by at least one group NR$^5$ where R$^5$ is H, hydroxyalkyl or CH$_2$CH$_2$NR$^6$R$^7$, R$^1$, R$^2$, R$^3$ and R$^4$ independently are alkyl which is uninterrupted or interrupted by at least one group NR$^5$ and/or is unsubstituted or substituted by at least one group NR$^6$R$^7$, R$^5$ is H, hydroxyalkyl or —R$^8$NR$^6$R$^7$ and R$^6$ and R$^7$ independently are H, hydroxyalkyl or —R$^8$NR$^6$R$^7$, R$^8$ is an ethylene or propylene radical, where (on average) at least 30%, in particular >60% and preferably >80% of the (hydroxyalkylatable) nitrogens carry a hydroxyalkyl.

The C$_2$–C$_8$-alkylene group is preferably interrupted by at least two groups NR$^5$. Particularly useful compounds of this type are reaction products of ethylene oxide with polyethyleneimines of various molecular weights having two or more structural elements NR$^6$R$^7$ and NR$^9$. Useful polyethyleneimines are those whose weight-average molecular weight is in the range from 400 to 2,000,000. The diagrammatic formula below is intended to illustrate this type of compound:

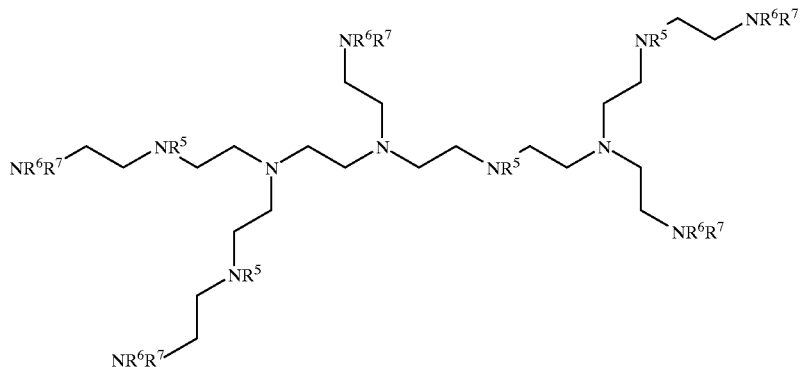

where

R⁵ is H, hydroxyethyl or —R⁸NR⁶R⁷ and R⁶ and R⁷ are H, hydroxyethyl or —R⁸NR⁶R⁷ and R⁸ is $(CH_2)_2$, where on average >40%, especially >60% and, with particular preference, >80% of the ethoxylatable NH functions of the polyethyleneimine have been reacted with ethylene oxide.

(4) Compounds of the formula Ie

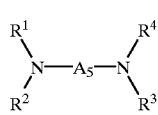

(Ie)

where $A_5$ is $C_6$–$C_{18}$-alkylene which is interrupted by at least one group NR⁵ where R⁵ is $(CH_2)_n$NR⁶R⁷ or alkyl which is uninterrupted or interrupted by at least one group NR⁵ in which R⁵ is $(CH_2)_n$R⁶R⁷ or alkyl and/or is unsubstituted or substituted by at least one group NR⁶R⁷, n is 2 or 3 and R¹, R², R³, R⁴, R⁶ and R⁷ independently are hydroxyalkyl or H.

Particularly useful compounds of this type are polyamines of the formulae:

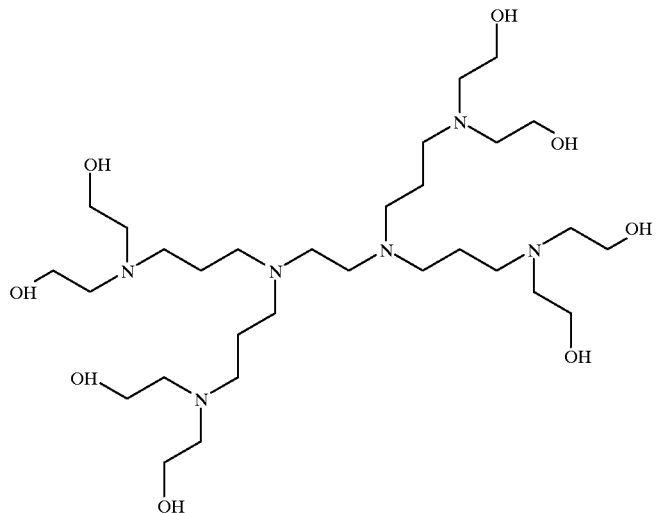

-continued

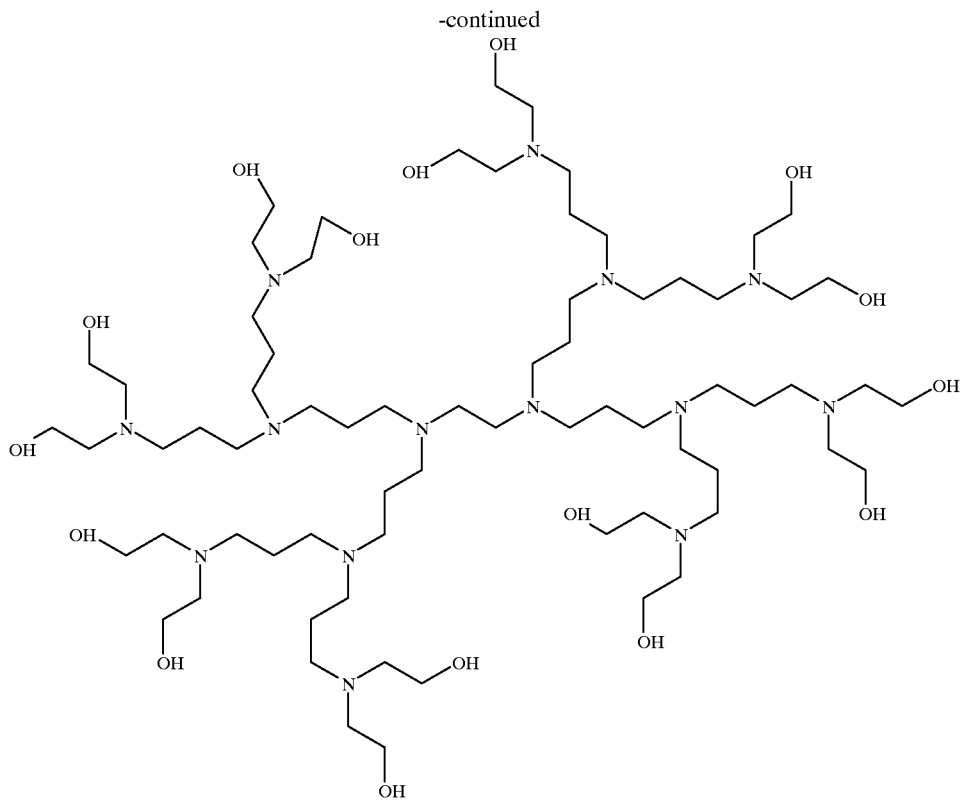

(5) Compounds of the formula If

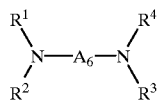
(If)

where $A_6$ is $C_2$–$C_{12}$-alkylene which is interrupted by at least one oxygen, and $R^1$, $R^2$, $R^3$ and $R^4$ independently are hydroxyalkyl or H.

The alkylene chain is preferably interrupted by 1, 2 or 3 oxygens. Particularly useful compounds of this type are the compounds of the following formulae:

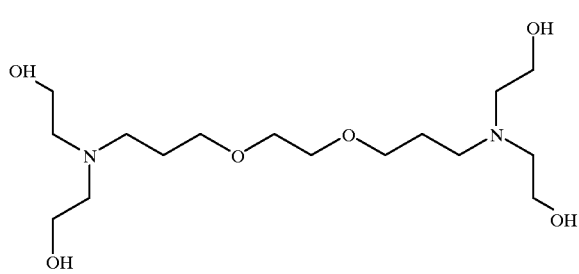

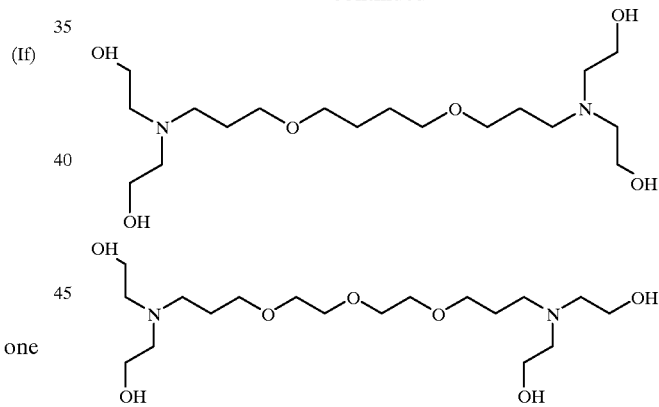

(6) Compounds of the formula Ig,

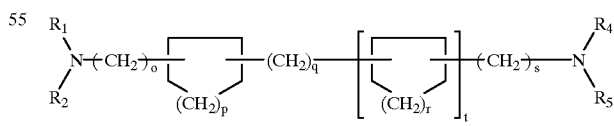
(Ig)

where o, q and s independently are 0 or an integer in the range from 1 to 6;

p and r independently are 1 or 2, and t is 0, 1 or 2, and where the cycloaliphatic rings can also be substituted by 1, 2 or 3 alkyls, and $R^1$, $R^2$, $R^3$ and $R^4$ independently are hydroxyalkyl or H. Particularly useful compounds of this type are

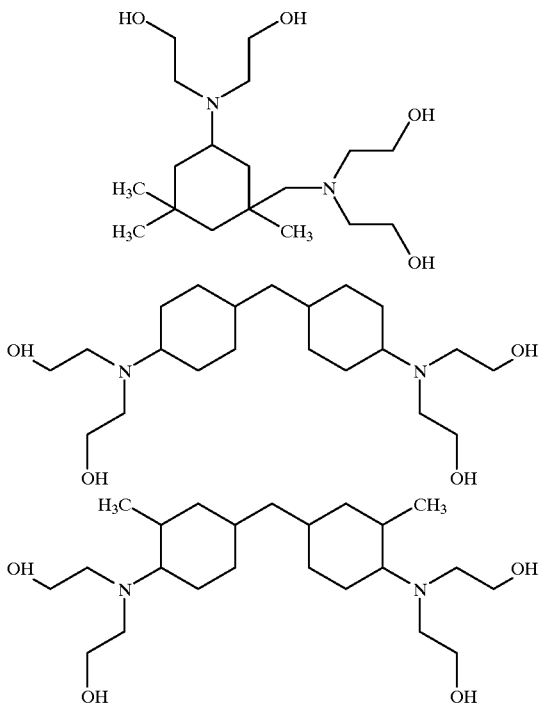

(7) Polyalkanolamines obtainable by condensation of di- or trialkanolamines with themselves or with one another, in the presence or absence of mono- or polyhydric alcohols or mono- or polyfunctional amines.

An example of such oligomeric or polymeric compounds is the condensation product, prepared from triethanol, which is represented in idealized form by the following diagrammatic formula:

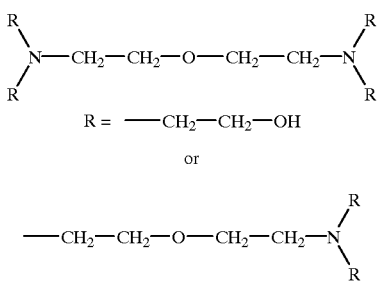

The compounds of the formulae Ia, Ib (except for the aminals), 1c, 1d, 1e, 1f and Ig can be prepared by reacting the corresponding polyamines with alkylene oxides.

The reaction of amines with alkylene oxide, especially ethylene and propylene oxide, to the corresponding alkanolamines is known in principle. It is done by reacting the amines with the alkylene oxides in the presence of a proton donor—generally water—at preferably from 30 to 120° C. under atmospheric or superatmospheric pressure, preferably at from 1 to 5 bar, using approximately one equivalent of the alkylene oxide per N—H function to be alkoxylated. For near-complete alkoxylation a small excess of alkylene oxide may be used, although it is preferred to employ the stoichiometric amount, or even an amount slightly below this, of the alkylene oxide relative to the N—H functions. Alkoxylation can be effected with one alkylene oxide or with a mixture of two or more alkylene oxides. Alternatively, alkoxylation can be carried out successively with two or more alkylene oxides.

Suitable catalysts other than water are alcohols or acids, although water is preferred (regarding the alkoxylation of amines cf. N. Schönfeld, Grenzflächenaktive Ethylenoxid-Addukte, pp. 29–33, Wissenschaftliche Verlagsgesellschaft mbH, Stuttgart 1976 or S. P. McManus et al., Synth. Comm. 3 (1973) 177).

The amount of water employed as catalyst and/or solvent may vary depending on what is required. In the case of liquid amines of low viscosity, amounts of water of from 1 to 5% are sufficient to catalyze the reaction. Solid, highly viscous or polymeric amines are advantageously reacted as solutions or dispersions in water; in this case, the amount of water can be from 10 to 90%.

Under the conditions described for the alkoxylation in the presence of water, essentially only the —NH groups are reacted. Alkoxylation with the resulting OH groups does not generally take place, so that there is essentially monoalkoxylation of the NH groups (in other words, not more than 1 mol of alkylene oxide is added on per mole of NH).

The mean degree of alkoxylation of the active NH groups is preferably >75% in the case of compounds having less than 5 nitrogens per molecule.

Examples of starting polyamines which can be used are α,ω-oligomethylenediamines, such as 1,2-ethylenediamine, 1,3-propanediamine, 1,6-hexamethylenediamine, 1,8-octamethylene-diamine, 1,12-dodecamethylenediamine, 2,2-dimethyl-1,3-propanediamine, 1,2-propanediamine, 2-(ethylamino)ethylamine, 2-(methylamino)-propylamine, N-(2-aminoethyl)-1,2-ethanediamine, N-(2-aminoethyl)-1,3-propanediamine, N-(2-aminoethyl)-N-methylpropanediamine, N,N-bis-(3-aminopropyl)-ethylenediamine, 4-aminoethyl-1,8-octanediamine, 2-butyl-2-ethyl-1,5-pentanediamine, 2,2,4-trimethylhexamethylenediamine, 2-methylpentamethylenediamine, 1,3-diaminopentane, 3-isopropylaminopropylamine, triethylenetetramine or tetraethylenepentamine. Oligo- and poly-N-(β-hydroxyethyl) amino compounds (aminals) can also be prepared by condensing aliphatic dialdehydes with diethanolamine.

Poly-N-(β-hydroxyethyl)amino compounds (8) are obtained, as described for example in U.S. Pat. No. 4,505,839 and DE-A-3 206 459, by thermal condensation of triethanolamine to poly(triethanolamine) or by thermal condensation of alkanol amines to hydroxyl-containing polyethers. Alkanolamines can also be condensed, as described in DE-A-1 243 874, in the presence of mono- and/or polyfunctional primary or secondary amines or mono- and/or polyhydric alcohols. Depending on the condensation conditions the molecular weight of these products and hence their viscosity can be varied within a broad range.

The weight-average molecular weights of these polycondensates are usually from 200 to 100,000.

The compounds of the formulae Ie can be prepared by alkoxylation of dendrimer polyamides, whose synthesis by Michael addition of aliphatic diamines onto acrylonitrile and subsequent catalytic hydrogenation is described in WO 93/14147. An example of this is the hydrogenated adduct of 4 mol of acrylonitrile and ethylenediamine. This hexamine with 4 primary amino groups can be further reacted in a similar manner to form the N-14 amine with 8 primary amino groups. Instead of ethylenediamine it is also possible to employ other aliphatic di- and polyamines.

Similarly, amino-containing polymers, such as polyethyleneimine, can be reacted with ethylene oxide in an aqueous solution to form useful poly-N-(β-hydroxyethyl) amino compounds, the degree of the conversion of the NH functions present being generally >40%, in particular >60% and preferably >80%. The preparation of polyethyleneimine is common knowledge. Polyethyleneimines in the molecular weight range $M_w$=800 to 2,000,000, for example, are obtainable from BASF under the name Lupasol®. Polyethyleneimines generally consist of branched polymer chains and hence contain primary, secondary and tertiary amino groups. Their ratio is customarily about 1:2:1. However, at very low molecular weights, higher proportions of primary amino groups are also possible. Substantially linear polyethyleneimines, which are obtainable by way of specific syntheses, are also suitable for this application.

Polymeric alkyleneimines with primary and/or secondary amino groups, which can be used in the novel compositions following alkoxylation, are described in Encyclopedia of Polymer Science and Engineering, H. Mark (Editor), Revised Edition, Volume 1, pp. 680–739, John Wiley & Sons Inc., New York, 1985.

Another possibility is to prepare hydroxyalkyl-substituted polyalkyleneimines by polymerizing N-hydroxyalkylaziridines. Furthermore, alkoxylated allylamine polymers and copolymers can also be used in the novel compositions.

The compounds of the formula If can be prepared starting from oxamines, such as 4,7-dioxadecane-1,10-diamine, 4,9-dioxadecane-1,12-diamine, 4,11-dioxatetradecane-1,4-diamine, 4,9-dioxadodecane-1,12-diamine and 4,7,10-trioxatridecane-1,13-diamine. Suitable starting amines also include polyoxyalkyleneamines, which are marketed by Huntsman under the name Jeffamine®. Examples are the diamines Jeffamine D-230, Jeffamine D-400, Jeffamine D-2000, Jeffamine D-4000, Jeffamine ED-600, Jeffamine ED-900, Jeffamine ED-2001, Jeffamine EDR-148 and the triamines Jeffamine T-403, Jeffamine T-3000 and Jeffamine T-5000.

Reaction products of aromatic polyamines with alkylene oxide are in principle also suitable for use in the novel compositions.

Component (A) and component (B) are preferably employed in a weight ratio (A:B) in the range from 50:1 to 1:50, preferably from 20:1 to 1:20, in particular from 1:15 to 15:1 and, with particular preference, from 5:1 to 1:5 (based on active ingredients).

The weight ratio of component (B) to component (C) is preferably in the range from 100:1 to 1:1, preferably from 50:1 to 15:1 and, with particular preference, from 30:1 to 2:1 (based in each case on active ingredients).

The compositions are prepared by mixing the components at room temperature or else at an elevated temperature. It has been found particularly suitable to employ component (A) as an aqueous dispersion and component (B) as an aqueous solution. With particular preference, component (B) is introduced as an aqueous solution, and component (A) as an aqueous dispersion is added to this solution with stirring. Component (C) can be used undiluted or as an aqueous solution with a concentration of preferably >25%.

The viscosity of the novel aqueous compositions, with a content of active ingredients of 40% by weight (sum of components A and B), is generally in the range from 10 to 100,000 mPa.s, measured in a rotary viscometer in accordance with DIN 53019 at 23° C. at a shear rate of 250 $s^{-1}$. Preference is given to viscosities of from 20 to 20,000 mPa.s, with particular preference from 50 to 5000 mPa.s.

If component (A) and/or (B) is an emulsion polymer it can be used, with comparable molecular weight or K value, to prepare compositions having a lower viscosity than with homogeneously dissolved, acid-containing polymers.

The novel compositions may contain a reaction accelerant, but are preferably devoid of such an accelerant. Suitable reaction accelerants include for example alkali metal hypophosphites, phosphites, polyphosphates, dihydrogen phosphates, polyphosphoric acid, hypophosphoric acid, phosphoric acid, alkylphosphinic acid or oligomers or polymers of these salts and acids.

Further suitable catalysts include strong acids such as sulfuric and p-toluenesulfonic acid. Similarly, polymeric sulfonic acids, for example poly(acrylamido-2-methylpropanesulfonic acid), poly(vinylsulfonic acid), poly (p-styrenesulfonic acid), poly(sulfopropyl methacrylate) and polymeric phosphonic acids, such as poly(vinylphosphonic acid), and copolymers derived therefrom with the comonomers described above, are suitable.

It is additionally possible to incorporate the accelerating sulfonic acid or phosphonic acid into the acid-containing polymer (B) by using the corresponding monomers such as, for example, acrylamido-2-methylpropanesulfonic acid, vinylsulfonic acid, p-styrenesulfonic acid, sulfopropylmethacrylate or vinylphosphonic acid as a comonomer in the preparation of the polymeric carboxylic acids.

Also suitable as catalysts are organotitanates and organozirconates, examples being triethanol titanate, titanium chelate ETAM and tetrabutyl zirconate, which are marketed for instance by Hüls.

Furthermore, the novel compositions may include customary additives depending on the intended application. For example, they may include bactericides or fungicides. In addition, they may include a hydrophobicizing agent for enhancing the water resistance of the treated substrates. Suitable hydrophobicizing agents are customary aqueous paraffin dispersions or silicones. The compositions may further include wetting agents, thickeners, plasticizers, retention agents, pigments and fillers.

Finally, the novel compositions may include customary fire retardants, such as aluminum silicates, aluminum hydroxides, borates and/or phosphates.

The compositions frequently also include coupling reagents, such as alkoxysilanes, for example 3-aminopropyltriethoxysilane, soluble or emulsifiable oils as lubricants and dustproofing agents, and also wetting aids.

The novel compositions can also be used in a blend with other binders, for example urea-formaldehyde resins, melamine-formaldehyde resins or phenol-formaldehyde resins, and also with epoxy resins.

The novel compositions are formaldehyde-free. This means that the novel compositions do not comprise any significant amounts of formaldehyde and do not release any significant amounts of formaldehyde during drying and/or curing. In general, the compositions comprise <100 ppm of formaldehyde. They make it possible to produce shaped articles with a short curing time and confer excellent mechanical properties on the shaped articles.

The formaldehyde-free thermally curable compositions of this invention are essentially uncrosslinked and hence thermoplastic in use. If necessary, however, they can be pre-crosslinked to a small extent.

On heating, the water present in the composition evaporates, and the composition undergoes curing. These processes can take place in succession or simultaneously. Curing in the present context is understood as meaning the chemical alteration of the composition, for example crosslinking through formation of covalent bonds between the various constituents of the compositions, formation of ionic interactions and clusters, and formation of hydrogen bonds. Furthermore, curing can be accompanied by physical changes in the binder, examples being demixing (separation) processes, phase transitions or phase inversion.

As a consequence of curing, the solubility of the composition decreases and, for example, water-soluble compositions are converted into materials that are partially to extensively insoluble in water.

The degree of curing can be characterized by extraction experiments on the cured compositions in appropriate solvents such as water or acetone. The higher the degree of curing, the more cured material remains insoluble and so the higher its gel fraction.

The curing temperatures are from 75 to 250° C., preferably from 90 to 200° C. The duration and temperature of heating influence the degree of curing. An advantage of the novel compositions is that they can be cured at comparatively low temperatures. For example, marked crosslinking takes place even at from 100 to 130° C.

Curing can also take place in two or more stages. For instance, a first step can be carried out with a curing temperature and time such that only a low degree of curing is achieved, while substantially complete curing takes place in a second step. This second step can take place spatially and chronologically separated from the first step. This makes it possible, for example, to use the novel compositions to produce binder-impregnated semi-finished goods which are shaped and cured to completion at another site.

The compositions are used in particular as binders for producing shaped articles from fibers or chips. The chips or fibers can be composed of renewable raw materials or synthetic or natural fibers, for example from clothing wastes. Suitable renewable raw materials include in particular sisal, jute, flax, coir fibers, banana fibers, hemp and cork. Particular preference is given to wood fibers or wood chips.

The shaped articles preferably have a density of from 0.2 to 1.0 g/cm$^3$ at 23° C.

Shaped articles contemplated include, in particular, sheets. Their thickness is generally at least 1 mm, preferably at least 2 mm. Also appropriate are automotive interior parts, examples being interior door linings, dashboard members and parcel shelves.

The weight of binder used is generally from 0.5 to 40% by weight, preferably from 1 to 30% by weight (binder solids, calculated as the sum of A+B), based on the substrate (fibers or chips).

The fibers or chips can be coated directly with the binder or mixed with the aqueous binder. The viscosity of the aqueous binder is preferably (and especially for the production of shaped articles from wood fibers or wood chips) adjusted to within the range from 10 to 10,000, with particular preference from 50 to 5,000, and, with very particular preference, from 100 to 2,500 mPa.s (DIN 53019, rotary viscometer at 250 s$^{-1}$).

The mixture of fibers, chips and the binder can be predried, for example at from 10 to 150° C., and then can be pressed, for example at temperatures from 50 to 250° C., preferably from 100 to 240° C. and, with particular preference, from 120 to 225° C. and at pressures of in general from 2 to 1,000 bar, preferably from 10 to 750 bar and, with particular preference, from 50 to 500 bar to give the shaped articles.

The binders are particularly suitable for producing woodbase materials such as wood chipboard and wood fiberboard (cf. Ullmanns Encyclopädie der technischen Chemie, 4th Edition 1976, Volume 12, pp. 709–727), which can be produced by bonding comminuted wood, for example wood chips and wood fibers. The water resistance of woodbase materials can be increased by adding a commercially available aqueous paraffin dispersion or other hydrophobicizing agent to the binder or, beforehand or subsequently, to the fibers or chips.

The manufacture of chipboard is common knowledge and is described, for example, in H. J. Deppe, K. Ernst Taschenbuch der Spanplattentechnik, 2nd Edition, Verlag Leinfelden 1982.

Preference is given to using chips whose size is on average within the range from 0.1 to 4 mm, in particular from 0.2 to 2 mm, and which have a water content of less than 6% by weight. However, it is also possible to use distinctly coarser chips and chips having a higher moisture content. The binder is applied as uniformly as possible to the woodchips using a weight ratio of binder to woodchips, based on the active ingredients (calculated as A)+B)) of preferably from 0.02:1 to 0.3:1. Uniform distribution can be obtained, for example, by spraying a finely divided form of the binder onto the chips.

The resinated woodchips are then sprinkled out to form a layer with a very uniform surface, the thickness of the layer depending on the thickness desired for the finished chipboard. The sprinkled layer is pressed at a temperature of, for example, from 100 to 250° C., preferably from 120 to 225° C., and using pressures of customarily from 10 to 750 bar, to form a board. The pressing times required can vary within a wide range and are in general from 15 seconds to 30 minutes.

The wood fibers of appropriate quality required for manufacturing medium density fiberboard (MDF) from the binders can be produced by grinding bark-free woodchips in special mills or refiners at about 180° C.

To apply binder to them, the wood fibers are generally suspended in a stream of air and the binder is blown into the resulting fiber stream (blow-line process). The ratio of wood fiber to binder based on the dry content and solids content, respectively, is usually from 40:1 to 2:1, preferably from 20:1 to 4:1. The resinated fibers are dried in the fiber stream at from 130 to 180° C., for example, sprinkled out to form a fiber web, and compressed at pressures from 20 to 40 bar to form boards or shaped articles.

The resinated wood fibers can also, as described for example in DE-OS 2 417 243, be processed to form a transportable fiber mat. This semi-finished product can then be processed further in a second, spatially and chronologically separate step to form boards or moldings, such as interior door linings of motor vehicles.

Other natural fiber materials as well, such as sisal, jute, hemp, flax, coir fibers, banana fibers and other natural fibers, can be processed into boards and moldings using the binders. The natural fiber materials can also be used in mixtures with synthetic fibers, for example polypropylene, polyethylene, polyesters, polyamides or polyacrylonitrile. These synthetic fibers can in this case also function as cobinders alongside the novel binder. The proportion of synthetic fibers in this instance is preferably less than 50% by weight, in particular less than 30% by weight and, with very particular preference, less than 10% by weight, based on all chips or fibers. The fibers can be processed by the method used for wood fiberboards. Alternatively, preformed natural fiber mats can be impregnated with the novel binders, with or without the addition of a wetting aid. The impregnated mats are then pressed in the binder-moist or predried state, for example at from 100 to 250° C. and at pressures of from 10 to 100 bar, to form boards or moldings.

The shaped articles obtained in accordance with the invention feature low water absorption, low thickness swelling after water storage, high strength and freedom from formaldehyde.

In addition, the novel compositions can be used as binders for coating and impregnating materials for boards composed of organic and/or inorganic fibers, nonfibrous mineral fillers and also starch and/or aqueous polymer dispersions. The coating and impregnating materials confer on the boards a high flexural modulus and great humidity resistance. The production of such boards is known.

Boards of this kind are customarily employed as acoustic insulating boards. The thickness of the boards is customarily in the range from about 5 to 30 mm, preferably in the range from 10 to 25 mm. The edge length of the square or rectangular boards is usually within the range from 200 to 2,000 mm.

Furthermore, the novel compositions can comprise auxiliaries customary in coating and impregnating technology. Examples of these are finely divided inert fillers, such as aluminum silicates, quartz, precipitated or pyrogenic silica, light and heavy spar, talc, dolomite or calcium carbonate; coloring pigments, such as titanium white, zinc white, iron oxide black, etc., foam inhibitors, such as modified dimethylpolysiloxanes, and adhesion promoters and also preservatives.

The components (A), (B) and (C) are generally present in the coating material in an amount of from 1 to 65% by weight. The proportion of inert fillers is generally from 0 to 85% by weight, while that of water is at least 10% by weight.

The compositions are used in a conventional manner by application to a substrate, for example by spraying, rolling, casting or impregnating. The amounts applied, based on the sum of components (A) and (B) in the composition, are generally from 2 to 100 9/$M^2$.

The amounts of additives to be employed are known to the skilled worker and depend in each particular case on the desired properties and the intended use.

The compositions of the invention are also suitable for use as binders for insulants composed of inorganic fibers, such as mineral fibers and glass fibers. Such insulants are produced industrially by spinning melts of the corresponding mineral raw materials; see U.S. Pat. Nos. 2,550,465, 2,604, 427, 2,830,648, EP-A-354 913 and EP-A-567 480. The composition is then spread onto the freshly prepared inorganic fibers while they are still hot. The water then largely evaporates, leaving the composition adhering to the fibers as a viscous material in an essentially uncured state. A continuous, binder-including fiber mat produced in this way is transported on suitable conveyor belts through a curing oven. There, the mat cures at from about 100 to 200° C. to form a stiff matrix. After curing, the insulant mats are processed to their final form in an appropriate manner.

The predominant proportion of the mineral or glass fibers used in the insulants is of a diameter within the range from 0.5 to 20 m and of a length in the range from 0.5 to 10 cm.

The novel compositions are additionally suitable for use as binders for fiber webs.

Suitable fiber webs include, for example, webs composed of cellulose, cellulose acetate, esters and ethers of cellulose, cotton, hemp, animal fibers, such as wool or hairs, and especially webs of synthetic or inorganic fibers, examples being aramid, carbon, polyacrylonitrile, polyester, mineral, PVC or glass fibers.

If used as binders for fiber webs the novel compositions may include, for example, the following additives: silicates, silicones, boron-containing compounds, lubricants, wetting agents.

Preference is given to glass fiber webs. The unbonded fiber webs, glass fiber webs in particular, are bonded, ie. consolidated, by the novel binder.

To this end the binder of the invention is applied to the unbonded fiber web, for example by coating, impregnating or saturating, preferably in a weight ratio of fiber/polymer (A) and (B) (solids) of from 10:1 to 1:1, particularly preferably from 6:1 to 3:1.

In this case, the binder is preferably used in the form of a dilute aqueous formulation with a water content of from 95 to 40% by weight.

Following application of the binder to the unbonded fiber web, the web is generally dried, preferably at from 100 to 400° C., in particular from 130 to 280° C. and, with very particular preference, from 130 to 230° C., for a period of preferably 10 seconds to 10 minutes, in particular 10 seconds to 3 minutes.

The resulting bonded fiber web has high strength in the wet and dry state. The novel binders allow, in particular, short drying times and also low drying temperatures.

The bonded fiber webs, especially glass fiber webs, are suitable for use as or in roofing membranes, as backing materials for wallpapers or as inliners or backing material for floor coverings, for example floor coverings composed of PVC.

When used as roofing membranes, the bonded fiber webs are generally coated with bitumen.

The aqueous compositions according to the invention can also be used to produce foamed boards or shaped articles. For this purpose, the water present in the composition is first removed at temperatures <100° C. down to a level of <20% by weight. The viscous composition which results is then foamed at temperatures >100° C., preferably at from 120 to 300° C. The residual water still present in the mixture and/or the gaseous products formed in the curing reaction may serve as blowing agents. The resulting crosslinked polymer foams can be used, for example, for thermal and acoustic insulation.

The novel compositions can be used for impregnating paper, which is subsequently dried under gentle conditions, to produce laminates, for example for decorative applications, in accordance with the known techniques. In a second step, heat and pressure are used to apply these laminates onto the substrate to be coated under conditions chosen such that the binder will cure.

The compositions of the invention are additionally suitable as formaldehyde-free core sand binders for producing casting molds and cores for metal casting according to the conventional processes. They are also suitable as binders for producing sandpapers and abrasives by processes as commonly carried out with phenolic resins.

The examples which follow illustrate the invention. In the examples, SC denotes the solids content as determined from the weight loss of a defined sample on drying at 120° C. for 2 h. The viscosity was determined at 250 sec-$^{-1}$ in accordance with DIN 53019 at 23° C. (using a Rheomat from Physica). The K value of component (B) was determined using a 1% strength by weight aqueous solution of the polymer by a method similar to DIN 53726. Determination of the weight-average polymer particle diameter for component (B) was by quasi-elastic light scattering on a diluted sample of dispersions B using a light scattering photometer (Autosizer from Malvern), the dispersions having been adjusted to a solids content of 0.01% by weight using 2% strength by weight aqueous sodium lauryl sulfate solution.

I. Preparing Component (A)

Polymer Solution A1

A 4 l glass vessel with anchor stirrer was charged with 590 g of water, 4.7 g of a 15% strength aqueous sodium lauryl sulfate solution, 35 g of styrene, 35 g of ethyl acrylate and 2.1 g of acrylic acid and this initial charge was heated to 85° C. At 85° C., the addition of feed stream 1 and feed stream 2 was begun simultaneously. Feed stream 1 consisted of a stirred emulsion of 550 g of water, 88.6 g of 15% strength sodium lauryl sulfate solution, 665 g of styrene, 665 g of ethyl acrylate and 40 g of acrylic acid. Feed stream 1 was metered in over the course of 3 h. Feed stream 2 was a solution of 8.4 g of sodium peroxodisulfate in 200 g of water and was metered in over the course of 3.5 h. The mixture was subsequently cooled to 70° C. Then 14 g of a 10% strength aqueous solution of t-butyl hydroperoxide and 6.3 g of a 20% strength aqueous saline solution of sodium hydroxymethanesulfinate were added over the course of 1 h. SC: 39%; pH: 3.2; viscosity: 65 mPas; weight-average particle diameter: 196 nm.

Polymer Dispersion A2

A 2 l glass polymerization vessel with anchor stirrer was charged with 448 g of water and heated to 80° C. The apparatus was flushed with nitrogen, 10% by weight of the total amount of feed stream 1 and 20% by weight of the total amount of feed stream 2 were added all at once to the polymerization vessel, and the mixture was stirred at 80° C. for 15 minutes. Then, at 80° C., the remainder of feed stream 1 was supplied continuously over the course of 3 h and the remainder of feed stream 2, at a separate point, was supplied continuously over the course of 3.5 h. The result was a polymer dispersion having a solids content of 45.2%, a viscosity of 30 mPas and a pH of 2.5. The weight-average particle diameter of the polymer was 163 nm.

Feed stream 1:
  426 g of water
  2.9 g of 75% strength by weight aqueous phosphonic acid
  36 g of 40% strength by weight aqueous solution of ethoxylated oleylmonoamine having a mean degree of ethoxylation of 12
  361 g of styrene
  217 g of methyl methacrylate
  144 g of n-butyl acrylate
Feed stream 2:
  56 g of water
  1.8 g of Azostarter V 50 (Wako Chemicals GmbH)

II. Preparing Component (B)

Polymer Solution B1

The preparation examples of EP-A-075 820 were drawn on to prepare a copolymer comprising 55% by weight acrylic acid and 45% by weight maleic acid. The free-radical initiator employed was hydrogen peroxide and the temperature of polymerization was 130° C. The solids content of the resulting aqueous polymer solution was 50% by weight, its pH 0.8 and its viscosity 110 mPas. The K value of the polymer was 12.4.

Polymer Solution B2

A homopolymer of acrylic acid was prepared in analogy to the preparation of the polymer solution B1. The solids content of the resulting aqueous polymer solution was 35% by weight, its pH 1.0 and its viscosity 160 mPas. The K value of the polymer was 24.

III. Binder Formulations

EXAMPLE 1

(Composition According to the Invention)

70 g of triethanolamine (component C) were added with stirring to 470 g of the aqueous polymer solution B1. 200 g of the aqueous polymer solution A1 were added to the resulting mixture over the course of 15 minutes with stirring (100 rpm). The solids content of the composition was 53% and its pH was 3.1. The viscosity was 190 mPas.

EXAMPLE 2

(Composition According to the Invention)

85 g of triethanolamine (component C) were added with stirring to 400 g of the aqueous polymer solution B2. 200 g of the aqueous polymer solution A2 were added to the resulting mixture over the course of 15 minutes with stirring (100 rpm). The solids content of the composition was 46% and its pH was 3.6. The viscosity was 110 mPas.

Comparative Example 1

Dispersion A2 without additives was used as the binder.

Comparative Example 2

Polymer solution B1 without additives was used as the binder.

Comparative Example 3

130g of triethanolamine (component C) were added with stirring to 870 g of the aqueous polymer solution B1. The solids content of the composition was 56% and its pH was 3.4. The viscosity found was 580 mPas.

Comparative Example 4

130 g of triethanolamine (component C) were added with stirring to 870 g of the aqueous polymer dispersion A2. The solids content of the composition was 47% and its pH was 5.1. The viscosity found was 165 mPas.

IV. Testing as Binders for Natural Fiber Mats

The binders from the abovementioned examples and comparative examples were diluted with water to a solids content of 25%. Jute/sisal mats about 1 cm thick (manufactured by Braunschweiger Jute- und Flachs-Industriebetriebe GmbH) were impregnated with the 25% strength binder liquor, using a padding roller, so that 25% by weight of nonvolatile binder components were applied, based on the dry fiber weight.

The impregnated fiber mats (35 30 cm) were dried in a convection oven at 80° C. to a residual moisture content of 10%, based on dry fiber, and were pressed using a hydraulic press at a temperature of 200° C. under a pressure of 1.5 N/mm$^2$. The pressing time was 2 minutes.

The flexural strength (FS) was measured by means of the three-point bending test in accordance with DIN 52352 at different temperatures (23° C., 60° C. and 100° C.). The thickness swelling (TS) was determined as the relative increase in thickness of 2 2 cm sections of the pressed fiber mats after storage for 2 h and 24 h, respectively, in water at 23° C. The climatic stability was assessed on the basis of 3 10 cm sections of the pressed fiber mats which had been stored in a conditioning cabinet at 80° C. and 90% relative atmospheric humidity for 1 day and 7 days, respectively. The strength of the test specimens was then assessed on the basis of a scale of ratings from 1 to 5, 1 denoting very high strength and 5 a very low strength.

The results of the experiments are summarized in Table 1.

TABLE 1

|  | Ex. 1 | Ex. 2 | CEx. 1* | CEx. 2* | CEx. 3* | CEx. 4* |
|---|---|---|---|---|---|---|
| Sheet thickness [mm] | 1.60 | 1.49 | 1.65 | 1.59 | 1.55 | 1.47 |
| Density [g/cm3] | 0.72 | 0.78 | 0.69 | 0.72 | 0.76 | 0.80 |
| FS 23° C. [N/mm2] | 32.9 | 34.1 | 29.4 | 35.5 | 38.1 | 22.5 |
| FS 60° C. [N/mm2] | 26.0 | 26.7 | 6.1 | 12.6 | 28.8 | 3.2 |
| FS 100° C. [N/mm2] | 20.7 | 19.0 | 2.0 | 2.9 | 22.6 | n. d. |
| TS 2 h [%] | 8 | 7 | 20 | 65 | 31 | 55 |
| TS 24 h [%] | 12 | 15 | 21 | 135 | 57 | 89 |
| Rating before climatic storage | 1 | 1 | 1 | 1 | 1 | 3 |
| Rating after 1 day of climatic storage | 2 | 2 | 2 | 5 | 3 | 5 |
| Rating after 7 days of climatic storage | 2 | 3 | 5 | 5 | 4 | 5 |

*Comparative Example
n. d. = not determinable

The results show the superior properties of the compositions of the invention (Examples 1 and 2) in comparison with components (A) and (B) alone (Comparative Examples 1 and 2) and relative to the compositions not in accordance with the invention (Comparative Examples 3 and 4).

We claim:

1. A thermally curable aqueous composition, comprising:
    (A) at least one polymer, obtained by free-radical polymerization, which comprises ≦5% by weight of an α,β-ethylenically unsaturated mono- or dicarboxylic acid, in copolymerized form,
    (B) at least one polymer, obtained by free-radical polymerization, which comprises ≧15% by weight of an α,β-ethylenically unsaturated mono- or dicarboxylic acid, in copolymerized form, and
    (C) at least one alkanolamine having at least two hydroxyalkyl groups.

2. The composition as claimed in claim 1, wherein (A) contains an α,β-ethylenically unsaturated $C_3$–$C_6$ mono- or dicarboxylic acid, in copolymerized form.

3. The composition as claimed in claim 1, wherein (A) contains as principal monomer a compound selected from the group consisting of an ester of acrylic or methacrylic acid with a $C_1$–$C_{12}$-alkanol, a vinylaromatic compound, a vinyl ester of a $C_2$–$C_{12}$ monocarboxylic acid and a $C_1$–$C_{12}$-alkyl vinyl ether, in copolymerized form.

4. The composition as claimed in claim 1, wherein (B) contains ≧20% by weight of the mono- or dicarboxylic acid in copolymerized form.

5. The composition as claimed in claim 1, wherein (B) contains as mono- or dicarboxylic acid, in copolymerized form, at least one compound selected from the group consisting of acrylic, methacrylic, crotonic, fumaric, maleic, 2-methylmaleic and itaconic acid.

6. The composition as claimed in claim 1, wherein (B) comprises an ethylenically unsaturated monomer, in copolymerized form, selected from the group consisting of an ester of (meth)acrylic acid with $C_1$–$C_{12}$ monoalcohol or dialcohol, a vinylaromatic compound, butadiene, a vinyl ester of aliphatic $C_2$–$C_{12}$ monocarboxylic acid, (meth)acrylonitrile, (meth)acrylamide, N-$C_1$–$C_6$-alkyl(meth)acrylamide, N,N-di-$C_1$–$C_6$-alkyl(meth)-acrylamide and a mixture thereof.

7. The composition as claimed in claim 1, wherein (C) is selected from the group consisting of diethanolamine, triethanolamine and a water-soluble, linear or branched aliphatic compound which comprises per molecule at least two functional amino groups of formula (a) or of formula (b):

(a)

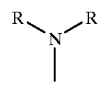

(b)

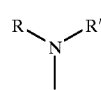

wherein R is hydroxyalkyl and R' is alkyl.

8. The composition as claimed in claim 1, wherein (C) comprises at least one compound of the formula I:

(I)

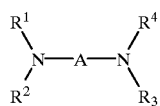

wherein

A is $C_2$–$C_{18}$-alkylene which is unsubstituted or substituted by one or more groups selected independently from alkyl, hydroxyalkyl, cycloalkyl, OH and $NR^6R^7$, where $R^6$ and $R^7$ independently are H, hydroxyalkyl or alkyl, and which is uninterrupted or interrupted by one or more oxygens and/or groups $NR^5$ where $R^5$ is H, hydroxyalkyl, $(CH_2)_nNR^6R^7$, where n is 2 to 5 and $R^6$ and $R^7$ are as defined above, or alkyl which in turn can be interrupted by one or more groups $NR^5$, where $R^5$ is as defined above, and/or can be substituted by one or more groups $NR^6R^7$, where $R^6$ and $R^7$ are as defined above;

or A is a radical of the following formula:

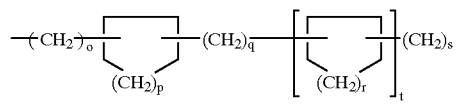

wherein o, q and s independently are 0 or an integer from 1 to 6;

p and r independently are 1 or 2; and t is 0, 1 or 2;

wherein the cycloaliphatic radicals in the formula of radical A may be substituted by 1, 2 or 3 alkyls; and $R^1$, $R^2$ and $R^3$ and $R^4$ independently are H, hydroxyalkyl, alkyl or cycloalkyl.

9. The composition as claimed in claim 8, wherein (C) is selected from at least one compound of the formula Ia:

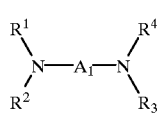

(Ia)

wherein $A_1$ is $C_2$–$C_{12}$ alkylene which is unsubstituted or substituted by at least one alkyl and/or at least one group $NR^6R^7$, where $R^6$ and $R^7$ independently are alkyl or hydroxyalkyl, and $R^1$, $R^2$, $R^3$ and $R^4$ independently are hydroxyalkyl or H, or one of $R^1$ or $R^2$ and/or one of $R^3$ and $R^4$ is alkyl or cycloalkyl.

10. The composition as claimed in claim 8, wherein (C) is selected from at least one compound of the formula Ib:

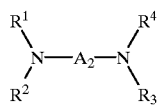

(Ib)

wherein $A_2$ is $C_2$–$C_8$-alkylene which is interrupted by at least one group $NR^5$ where $R^5$ or each $R^5$ independently is hydroxyalkyl or alkyl, and $R^1$, $R^2$, $R^3$ and $R^4$ independently are hydroxyalkyl or H.

11. The composition as claimed in claim 8, wherein (C) is selected from at least one compound of the formula Ic:

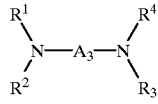

(Ic)

wherein $A_3$ is $C_2$–$C_8$-alkylene which is interrupted by at least one group $NR^5$ where $R^5$ is H, hydroxyalkyl or $CH_2CH_2NR^6R^7$, $R^1$, $R^2$, $R^3$, and $R^4$ independently are alkyl which is uninterrupted or interrupted by at least one group $NR^5$ and/or is unsubstituted or substituted by at least one group $NR^6R^7$, $R^5$ is H, hydroxyalkyl or —$R^8NR^6R^7$ and $R^6$ and $R^7$ independently are H, hydroxyalkyl or —$R^8NR^6R^7$, and $R^8$ is an ethylene or propylene radical, where, on average, at least 30% of the nitrogens carry a hydroxyalkyl.

12. The composition as claimed in claim 11, wherein (C) is a reaction product of a polyethyleneimine with ethylene oxide.

13. The composition as claimed in claim 8, wherein (C) is selected from at least one compound of the formula Ie:

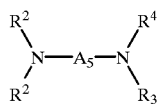

(Ie)

wherein $A^5$ is $C_6$–$C_{18}$-alkylene which is interrupted by at least one group $NR^5$ where $R^5$ is $(CH_2)_nNR^6R^7$ or alkyl which is uninterrupted or interrupted by at least one group $NR^5$ in which $R^5$ is $(CH_2)_nR^6R^7$ or alkyl and/or is unsubstituted or substituted by at least one group $NR^6R^7$, n is 2 or 3 and $R^1$, $R^2$, $R^3$, $R^4$, $R^6$ and $R^7$ independently are hydroxyalkyl or H.

14. The composition as claimed in claim 8, wherein (C) is selected from at least one compound of the formula If:

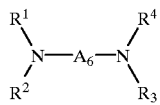

(If)

wherein $A_6$ is $C_2$–$C_{12}$-alkylene which is interrupted by at least one oxygen, and $R^1$, $R^2$, $R^3$ and $R^4$ independently are hydroxyalkyl or H.

15. The composition as claimed in claim 8, wherein (C) comprises polyalkanolamines obtained by condensation of dialkanol-amines and/or trialkanolamines with themselves, in the presence or absence of mono- or polyhydric alcohols or mono- or polyfunctional amines.

16. The composition as claimed in claim 7, wherein the hydroxyalkyl of (C) in the above definitions is a hydroxypropyl or hydroxyethyl.

17. The composition as claimed in claim 1, wherein the composition comprises (A) and (B) in a weight ratio (based on solids) of from 50:1 to 1:50 and comprises (B) and (C) in a weight ratio of from 100:1 to 1:1.

18. The composition as claimed in claim 1, wherein the molar ratio of carboxyls of (A) and (B) to hydroxyls of (C) is in the range from 20:1 to 1:5.

19. The composition as claimed in claim 1, where the composition further comprises a reaction accelerant.

20. A process for the manufacture of a shaped article, comprising:

impregnating a substrate with said thermally curable aqueous composition as claimed in claim 1, and curing the impregnated substrate by heat.

21. The process as claimed in claim 20, where the substrate is comprised of a finely divided material.

22. A shaped article obtained by the process as claimed in claim 20, which is a sheet made from a finely divided material.

23. A binder comprising a thermally curable aqueous composition as claimed in claim 1.

24. The composition as claimed in claim 1, wherein (B) contains ≧40% by weight of the mono- or dicarboxylic acid in copolymerized form.

25. The process as claimed in claim 21, wherein said finely divided material is a fiber or a chip.

26. The shaped article according to claim 22, wherein said finely divided material is selected from the group consisting of clipboard, fiberboard, an insulant and a fiber web.

27. The process as claimed in claim 21, wherein said finely divided material has a size of from 0.1 to 4 mm.

28. The shaped article according to claim 22, wherein said finely divided material has have a size of from 0.2 to 2 mm.

29. The process as claimed in claim 25, wherein said chip has a size of from 0.1 to 4 mm.

30. The process as claimed in claim 29, wherein said chip has a size of from 0.2 to 2 mm.

\* \* \* \* \*

UNITED STATES PATENT AND TRADEMARK OFFICE
CERTIFICATE OF CORRECTION

PATENT NO.    : 6,299,936 B1
DATED         : October 9, 2001
INVENTOR(S)   : Bernd Reck et al.

It is certified that error appears in the above-identified patent and that said Letters Patent is hereby corrected as shown below:

Column 11,
Lines 50-56,

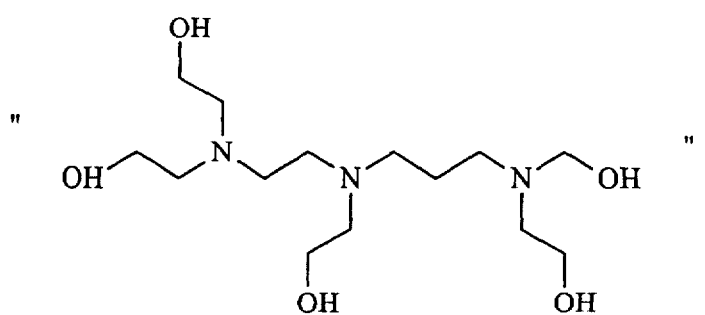

should read

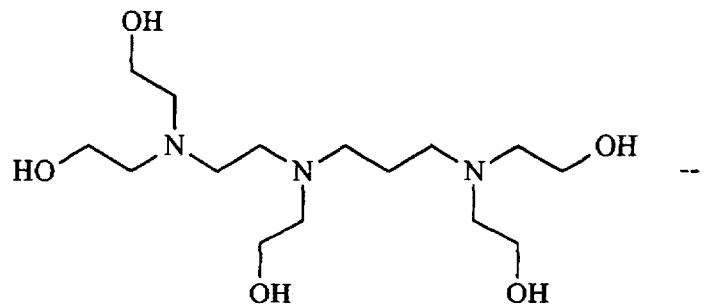

Column 12,
Line 55, "$NR^9$" should read -- $NR^5$ --.

Column 23,
Line 55, "0.5 to 20m" should read -- 0.5 to 20μm --.

Column 26,
Line 50, "(35 30 cm)" should read -- (35x30 cm) --;
Line 59, "2 2 cm" should read -- 2x2 cm --;
Lines 61-62, "3 10 cm" should read -- 3x10 cm --.

UNITED STATES PATENT AND TRADEMARK OFFICE
CERTIFICATE OF CORRECTION

PATENT NO. : 6,299,936 B1
DATED : October 9, 2001
INVENTOR(S) : Bernd Reck et al.

It is certified that error appears in the above-identified patent and that said Letters Patent is hereby corrected as shown below:

<u>Column 30,</u>
Lines 1-7, $$"\quad \begin{array}{c} R^2 \\ \phantom{R}\diagdown \\ \phantom{R^2}N-A_5-N \\ \phantom{R}\diagup \phantom{-A_5-}\diagdown \\ R^{2'} \qquad\quad R_3 \end{array} \quad "$$

should read -- 
$$\begin{array}{c} R^1 \\ \phantom{R}\diagdown \\ \phantom{R^1}N-A_5-N \\ \phantom{R}\diagup \phantom{-A_5-}\diagdown \\ R^{2'} \qquad\quad R^3 \end{array} \quad (Ie) \quad --$$

Signed and Sealed this

Fourteenth Day of May, 2002

*Attest:*

*Attesting Officer*

JAMES E. ROGAN
*Director of the United States Patent and Trademark Office*